United States Patent [19]

Egger et al.

[11] Patent Number: 5,456,931
[45] Date of Patent: Oct. 10, 1995

[54] PROCESS AND APPARATUS FOR THE PRODUCTION OF ELONGATED PASTA PRODUCTS, SUCH AS LASAGNA

[75] Inventors: Friedrich Egger, Niederuzwil; Werner Seiler, Zuberwangen; Heinz Resch, Flawil, all of Switzerland

[73] Assignee: Buhler AG, Uzwil, Switzerland

[21] Appl. No.: 140,154

[22] PCT Filed: Mar. 6, 1993

[86] PCT No.: PCT/CH93/00057

§ 371 Date: Nov. 23, 1993

§ 102(e) Date: Nov. 23, 1993

[87] PCT Pub. No.: WO93/17583

PCT Pub. Date: Sep. 16, 1993

[30] Foreign Application Priority Data

Mar. 7, 1992 [CH] Switzerland ............... 00718/92
Apr. 1, 1992 [WO] WIPO ............... PCT/CH92/00060

[51] Int. Cl.⁶ ............... A21C 9/08; A23L 1/16
[52] U.S. Cl. ............... 426/458; 426/451; 426/455; 426/456; 426/496; 426/503; 426/517; 426/518; 426/557; 99/470; 99/477; 99/483; 99/487; 34/209; 34/210; 83/932
[58] Field of Search ............... 426/451, 455, 426/456, 458, 496, 517–518, 503, 557; 99/470, 473, 477, 483, 484, 487; 34/209, 210, 212, 213; 83/481, 508.3, 563, 932

[56] References Cited

U.S. PATENT DOCUMENTS 3,512,336  5/1970  Rosecrans ............... 53/164
4,323,585  4/1982  Manser ............... 426/451 X
4,544,563  10/1985  Lechthaler ............... 426/557 X
4,769,975  9/1988  Fava ............... 53/516
4,775,542  10/1988  Manser et al. ............... 426/458
4,830,866  5/1989  Manser et al. ............... 426/451
4,915,966  4/1990  Guarneri ............... 426/557 X
5,059,439  10/1991  Wenger et al. ............... 426/451
5,101,717  4/1992  Manser et al. ............... 99/474

FOREIGN PATENT DOCUMENTS 0253307  1/1988  European Pat. Off. .
437357   4/1912  France .
317991   1/1957  Switzerland .
8603654  7/1986  WIPO .

Primary Examiner—Donald E. Czaja
Assistant Examiner—Milton I. Cano
Attorney, Agent, or Firm—Sandler, Greenblum & Bernstein

[57] ABSTRACT

This invention pertains to a process as well as an apparatus for the production of elongated pasta products, particularly lasagna, wherein the pasta products are formed via a pasta production apparatus in parallel lines, positioned on drying rods, dried and upon solidification, cut into packaging lengths and packed for consumer use. After cutting, the lasagna are moved, in series, via slides, and stacked in portions, of predeterminable numbers, at a conveyor. The conveyor preferably takes the form of a ring-type conveyor for the serial packaging of these portions, whereby inspections, additions and exact weight determination of these portions can be accomplished.

9 Claims, 10 Drawing Sheets

PROCESS AND APPARATUS FOR THE PRODUCTION OF ELONGATED PASTA PRODUCTS, SUCH AS LASAGNA

CROSS REFERENCE TO RELATED APPLICATIONS

This application claims the priority of PCT Application No. PCT/CH93/00057, filed Mar. 6, 1993, which in turn claims the priorities of both Swiss Application No. 00 718/92-8, filed Mar. 7, 1992 and PCT Application No. PCT/CH 92/00060, filed Apr. 1, 1992, the disclosures of which are incorporated herein by reference in their entireties.

BACKGROUND OF THE INVENTION

1. Field of the Invention

This invention pertains to a process and an apparatus for the production of elongated pasta products, for example lasagna, wherein the pasta products are produced via a pasta production apparatus in parallel lines, that is in series, are dried and, when solidified, cut into packing length and readied for packaging.

With all forms of long pasta, particularly with lasagna, the form stability, the cutting to length and the manipulation of the product until packaging, present particular demands. The main difficulty resides in bringing the individual products from the pasta apparatus into a consumer package, undamaged, in the required length and number.

2. Discussion of the Background of the Invention and Material Information

Lasagna are elongated, thin, dried, pasta bands and due to this form are subject to greater danger of breakage. The so-called special products are, up to this time, most often still packed by hand, in portions, into the consumer package. The advantage therein lies in the careful manipulation of human hands and the simultaneous visual inspection for possible defects or qualitative deficiencies of the product. This hand packaging however limits the output of the installation and makes the end product more expensive. Depending upon the production process, often many defects occur, particularly with flat products, already prior to packaging, which disrupt packaging and annoy the consumer.

Many solutions for the automatic packaging of such special products have already been proposed. For example, noodles, as hollow products, are packaged similarly to spaghetti. For this however, the production apparatuses must be changed for the "handling" at each product change and adapted thereto at a relative great expenditure.

The only functioning automatic packaging of lasagna, which is known in the art, is described in U.S. Pat. No. 4,769,975. Lasagna is prepared in series, corresponding in number to those hanging on a drying rod; cut by a noodle-cutting machine into two equal lengths while moving therethrough and transported by a pocket conveyor to a cutting unit end; transported from the upper surface of the conveyor to the lower surface of the conveyor and loaded, from there, into an intermediate magazine or storage area. The intermediate storage area has at least as many portion compartments as the number of pasta strips or bands that hang on one drying rod. Once the desired number for packaging into a consumer package has been located in the portion compartments, the entire series of portions is released to a packaging conveyor. During the filling phase of the intermediate storage area there is a sufficiently large time span wherein the packaging conveyor successively moves one portion compartment forwardly in a step basis, for the individual packaging of the portions at a transfer position at the end of the packaging conveyor. The usual lengths of the pasta strips, hanging on the drying rods, permit the production, during cutting, of two length of lasagna, next to each other, so that corresponding to the solution set forth in U.S. Pat. No. 4,769,975, includes adjacent, twin intermediate storage areas and a twin packaging conveyor.

The main deficiency of this solution lies in the difficulty of inspecting the products as well as in the concept of the single packaging. Even though the intermediate storage area permits a quasi continuous operation of the cutting apparatus, the single packaging finally limits the entire working capacity of the production line. Only even numbers of pasta products of each portion are possible. The problem of broken products is not solved.

SUMMARY OF THE INVENTION

The task for this invention was to develop a new concept which permits, with less damage to the pasta products, an automatic manipulation of the products while permitting a substantially higher production capacity.

The solution of the invention is therein characterized that the pasta products are produced in the pasta production apparatus with lateral spacing and correspondingly serially positioned, suspended and dried at the constant spacing stabilized and cut.

According to a preferred embodiment, for form stabilization purposes, the pasta products are compression molded from a paste having 28% - 35% water content and heated and dried at higher temperatures, wherein in the end zone of the drying process, in still the warm state, the water content of the outer layer, with reference to the entire product, is increased with at least 0.1% - 1.2% water, through water addition, over the outer surface, and the temperature of the products, immediately after the water addition, lowered to under 60° C., preferably to under 30° C., thus lowering the temperature of the climate surrounding the products, so as to achieve a moistened climate.

The pasta products are heated to above 80° C. in less than one hour and dried, at high temperature, in two to six hours, in which the water addition occurs at a product temperature of preferably over 75° C.

Advantageously, the lateral spacing between each two products is changed for the first time after the cutting operation, during the transfer to a conveyor for the transfer to packaging.

In a particularly advantageous embodiment for the manipulation and apportioning of elongated pasta products, particularly of lasagna, the pasta products are produced via a pasta apparatus in parallel lines, that is in series, dried and, when in a solidified form, cut into packing length and readied for packing. This embodiment is characterized in that the pasta products, after serial cutting, are preferably directly transferred to a conveyor and stacked and assembled into preselected number-portions.

The pasta products are dried while hanging on rods and are rod-transferred, via guides, and exactly positioned at a discharge element, and cut in motion or pass-through. The pasta products can be transferred in pairs, but are preferably singly transferred from the discharge element onto a conveyor that preferably takes the shape of a ring-type conveyor.

Additionally, it is provided that one or more product series are stored intermediately and delivered, via a control system, to the conveyor for the assembly of the portions. This permits, during short breakdowns, in the packaging portion of the system, and until the elimination thereof, to continue the operation of all other system parts up to the cutting apparatus.

Additionally, it is feasible that empty consumer packages can be readied on the ring-type conveyor, and that the pasta products, single, or in pairs, can be directly channelled into the packages, up to the attainment of the predetermined numbers of portions.

An additional, particularly interesting embodiment resides in the fact that the pasta product can, after cutting, slide through a chute onto the conveyor. The pasta products are cut in series and preferably guided by an endless conveyor, via a holding device, from an upper surface of the conveyor to a lower surface of the conveyor and moved to a tiltable support device and guided into a packaging conveyor, either singly or in pairs, via a chute. The chute is inclined in the charging zone, so that the pasta products, after a controlled release via the support surface, slide freely downwardly, under the influence of gravity, and are reoriented via an outlet portion into horizontal movement. Suction apparatus, corresponding to the number of products per series, are provided above the support device. The suction apparatuses rhythmically retain, in phase one each of the single products, and upon a timely delay, channel same singly to the conveyor via the chute.

The invention further pertains to an apparatus for the production of elongated pasta products, preferably for carrying out the process therefore and is therein characterized that it includes a long pasta form pasta press for the series production of pasta products in parallel lines, a device for the positioned hanging of the products on drying rods, a through-put dryer with a stabilizer, as well as a cutting apparatus with a transfer mechanism to a conveyor for packaging. The through-put dryer includes, in a preferred embodiment, a large number of elements, having zone climatic control, for form stabilization of the products during the final drying, having at the end of the drying cycle, a water addition element, wherein the water addition element, includes means for maintaining the climate at a high temperature, preferably followed by a cooling element arranged after the water addition element but separated via a sluice or charging valve.

In a particularly advantageous embodiment, a transfer chute is arranged between a cutting apparatus and a conveyor for the serial transfer of the products via gravity. Contrary to original fears, the chute permits not only a gentle transfer of the products onto the packaging conveyor, but also simultaneously permits trouble-free insertion, with high precision, independent of the length of the lasagna. In the region above the transfer chute, a suction-grabbing apparatus can be added for the serial holding back of single lasagna strips. The cutting apparatus is preferably arranged at the reversing region of the endless conveyor and includes a reversing mechanism for the cutting disks. The cutting mechanism includes several, preferably three cutting heads, which, spaced relative to each other, are arranged in the reversing region, whereby the cutting apparatus is formed as a reversing head, with means for advancing and retracting the reversing head relative to the endless conveyor, as well as for the rotation, preferably of 180°, around a horizontal axis. The cutting heads are each provided with an individual drive, in which preferably all functions are controllable via a common control. In this manner, the cutting disks of the cutting apparatus can be exchanged during the normal operation of the entire system without the danger of an accident.

Particularly, for the automatic production of uneven numbers of products it is proposed, in the region of the conveyor, which preferably takes the form of a ring-type of conveyor, to arrange an intermediate storage area or reservoir, for the serial intermediate storage of single products. The ring-type conveyor can further include a lateral displacement apparatus, for the serial transfer of entire portions onto a packaging conveyor.

In accordance with an advantageous further embodiment in the area of the transfer chute, a sensor is assigned to each individual chute, with the sensor forming a counter, via a computer, for the production or the controlling of the number of portions. The sensor can, for example, be a photo cell so that via corresponding signal analysis each single product can be inspected for damage or breakage.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein there is shown.

DETAILED DESCRIPTION OF THE PREFERRED EMBODIMENTS

Figure 1:
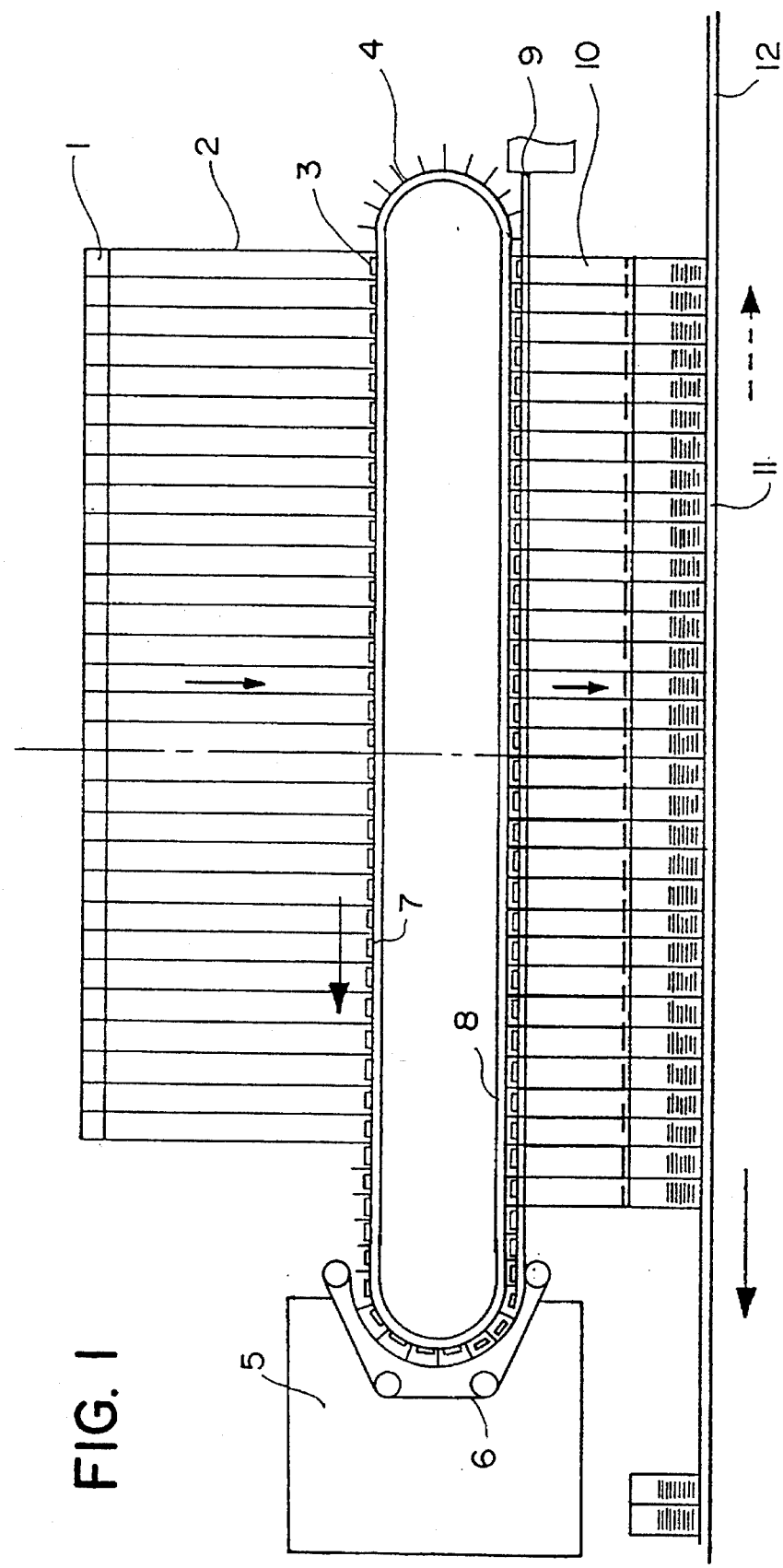
in FIG. 1, the schematic transfer of the products from a deposit table to a conveyor.

Reference is now made in sequence to FIG. 1. From a deposit table 1, via guides 2, lasagna 3 is deposited on an endless pocket-type conveyor 4 at exact intervals, wherein at the same time the entire amount carried on a single, not illustrated, rod is deposited as an entire series. FIGS. 13 and 14 show an additional advantageous development variation which is very favorable with reference to the cutting time and to the process of optimization.

The lasagna, which is vertically paired on conveyor 4, is transferred, after cutting, onto a second conveyor 90 which is parallel to and located underneath conveyor 4. Conveyor 90 has a slightly greater rotational speed in order to achieve good synchronization with the succeeding packaging operation.

The transfer of the lasagna onto conveyor 90, which preferably takes the form of a chain-type of conveyor, causes a turning of the layers, so that the inner layer becomes the outer layer. This ensures the effective sorting of broken lasagna pieces from both layers and improves the subsequent handling thereof. The broken lasagna pieces are removed underneath the conveyor, for example via simple non-illustrated slides.

Conveyor 90 includes covers or flaps 91 for the retention and controlled transmission of the lasagna onto a transfer table 92, arranged underneath conveyor 90, with transfer table 92 being linearly movable relative to a packaging conveyor. Sensors, analogous to those used with chute 10, are located at transfer table 92, that is between table 92 and buckets 94 of conveyor 12, in order to permit a continuous presence control of the lasagna. Suction grippers 93 are arranged at transfer table 92 for stacking the lasagna in the buckets 94 of packaging conveyor 12.

The lasagna is orderly deposited, in pairs, from conveyor 90, onto the transfer table by means of flaps 91. Thereafter, the transfer table moves outwardly and the lasagna is seized by suction grippers 93 and stacked in buckets 94. The stacking and counting of the lasagna is achieved in a manner analogous with that of chute 10.

While there are shown and described present preferred embodiments of the invention, it is to be distinctly understood that the invention is not limited thereto, but may be otherwise variously embodied and practiced within the scope of the following claims and the reasonably equivalent structures thereto. The lasagna strips are cut in a continuous through-put into package size via a cutting apparatus 5. The cut lasagna are held by a guide band 6, transferred from an upper surface 7 to a lower surface 8 of pocket-type conveyor 4 and thereafter held in a supported state on a tiltable support surface 9 for a short time until the entire series of products of one drying rod is deposited over chutes 10 arranged thereunder.

Figure 2:
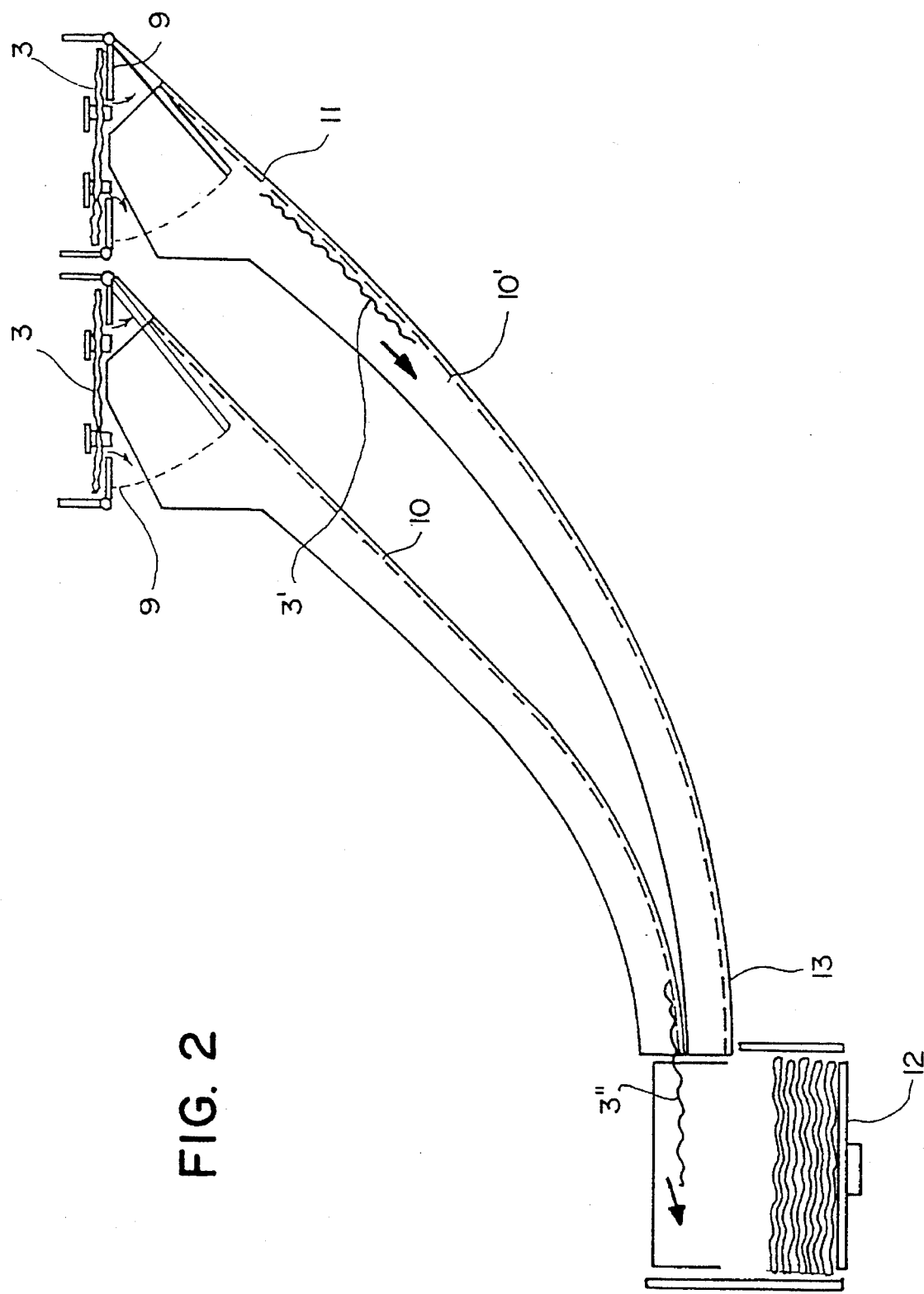
in FIG. 2, a chute between a cutting apparatus and a conveyor.

FIG. 2 represents the manner of functioning of chutes 10 and 10'. The cut lasagna lies on support surface 9, until after a tilting movement of support surface 9, it is deposited on chute 10, and via the force of gravity, it tilts and slides downwardly (lasagna 3'). Each chute 10, 10' takes the form of a U-shaped trough having side guides. Lasagna 3' slide, from an upper slanted charging zone 11, downwardly over a substantially horizontally extending charging zone end 13, onto conveyor 12 (lasagna 3"). According to the solution set forth in FIG. 2, both chutes 10 and 10' can be used for the reception of the same portion, with chute 10 terminating slightly higher than chute 10'. Conveyor 12 can take the form of a pocket-type of conveyor or the empty packaging container can rest directly thereupon and the single products can be inserted directly into the containers via the chutes.

Figure 3:
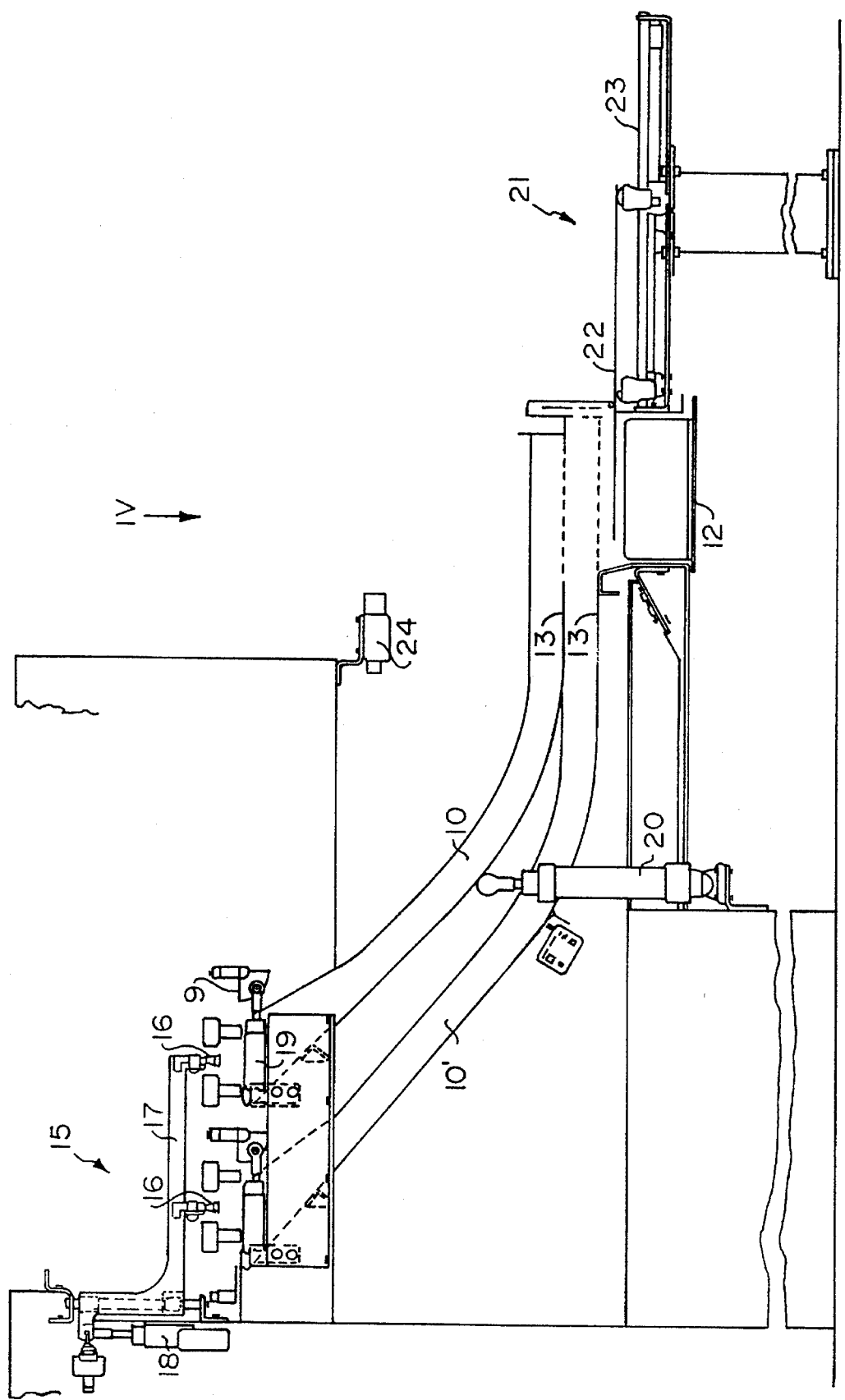
in FIG. 3, a solution corresponding to FIG. 2, however with a suction retaining apparatus as well as an intermediate storage area.

FIG. 3 shows a further embodiment of FIG. 2, with FIG. 3 additionally utilizing a suction apparatus 15 that is arranged in a region above support surface 9. The right side of this drawing shows an additional intermediate storage area 21. As is the case with FIG. 2, in FIG. 3 the entire transfer mechanism is duplicated. Depending upon the desired packaging length, any number, for example 1- 4, transfer mechanisms can be utilized. Since the elongated products are preferably dried on rods and have two U-shaped webs, the products arrive at the cutting apparatus in two layers, This dual layer remains in tact until the deposit thereof upon support surface 9, so that normally four products to be packaged result from one dried product, namely two overlying or superimposed ones. In the smallest packaging sizes, two superimposed products can be released simultaneously via chute 10 or 10' onto conveyor 12. In addition, it is also possible to arrange for two parallel conveyors 12, each using one chute 10 or 10'. In the illustrated example however, both chutes 10 and 10' feed the same conveyor 12. The respective support surface 9 of chutes 10 and 10' must be actuated in a time-delayed manner so that both package products do not interfere with each other at the conveyors. Thus, they must be released after each other on a timely basis. With normal lasagna products it has been determined that it is advantageous that the products slide singly, not in two layers. Since lasagna typically has a wavy side edge, in this manner, mutual interference can be avoided. In the total time phase there are no disadvantages since in principle the products are 7 cut individually into packaging length, but are released in series, for example 20- 30 pieces, onto conveyor 12. The products can also be rotated by the support surfaces in order to achieve optimum stacking of the products.

Of the two superimposed lasagna strips, the respective upper one can be retained by a suction gripper 16, two of which are attached to frame 17. In order to avoid interferences, frame 17, together with suction gripper 16, can be raised and lowered by means of cylinders 18, if need be, even in a stepped time sequence manner. Support surfaces 9 are actuated via two separate cylinders 19 to and from the support and tilt positions. It has been determined that it is sufficient if but one support surface is tilted. Since both chutes are exactly superimposed, the upper chute 10 can be raised by lift cylinder 20 for cleaning purposes or in case of a breakdown. Very advantageous operation is achieved via the use of an intermediate storage area 21. For example, if there is a momentary stoppage in the packaging phase, so that after the placement of an entire number of portions on conveyor 12 and the latter cannot be set in motion, via the insertion of a support plate 22, by adjusting apparatus 23, all mechanisms located prior thereto can be operated at full capacity. Instead of stacking the products to be packaged directly upon conveyor 12 in the desired numbers, one, two or more layers can be stacked on support plate 22, and upon the unblocking of conveyor 12, can be released as an entire package.

Figure 4:
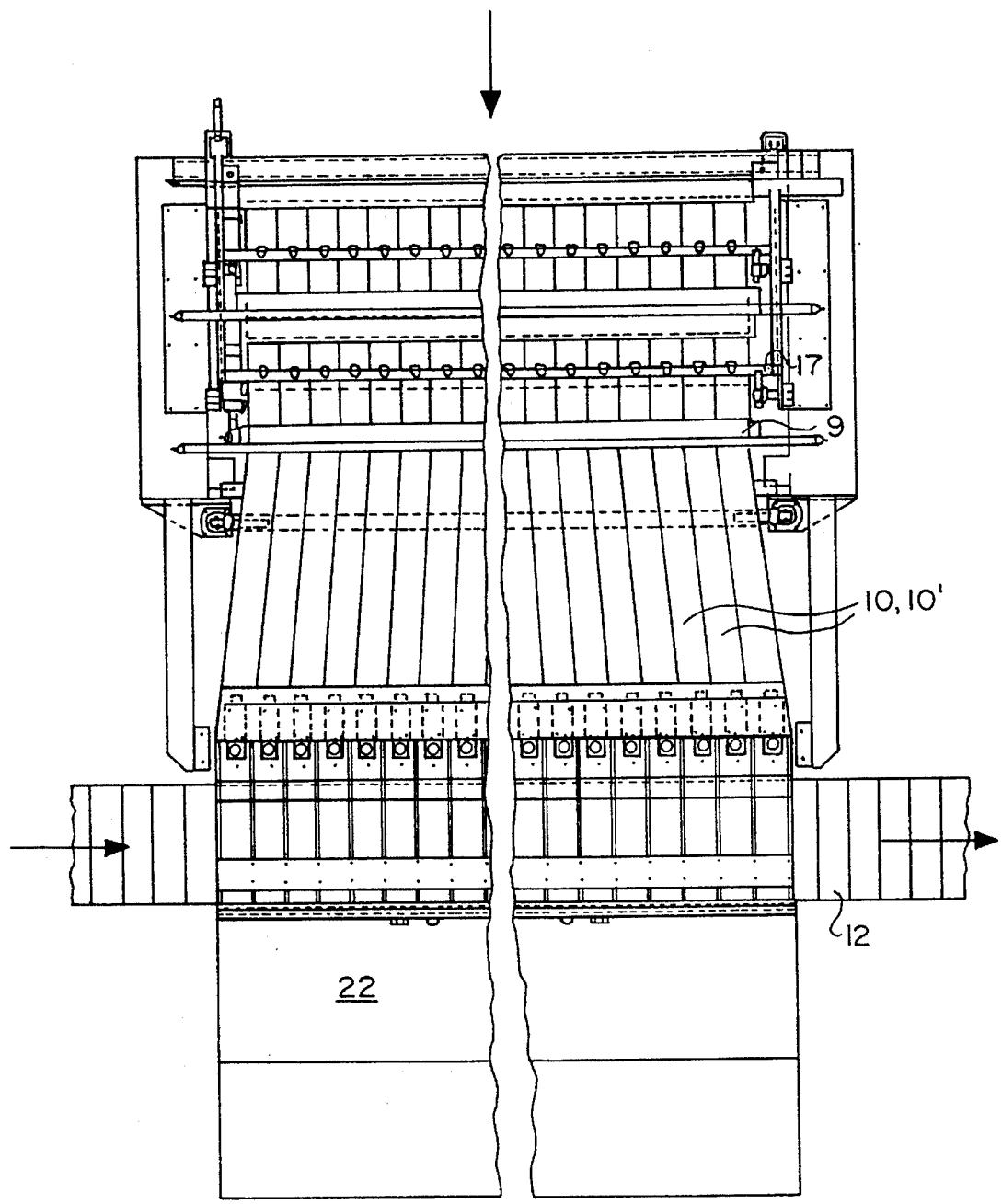
in FIG. 4, a plan view according to arrow IV in FIG. 3.

As shown in FIGS. 3 and 4, individual sensors 24 are mounted above each chute 10, 10' for inspecting, controlling, and counting the products.

As shown in FIG. 4, there is one chute 10 or 10' for each of the numbers of dried products that hang on each drying rod. Herewith the products can be transferred in series to the conveyor after cutting. Since during packaging there is, in general, a greater distance that is required between the individual portions, this distance variation can be achieved via a corresponding diverging of all chutes 10, 10'. The lasagna is moved, via appropriate guidance, from the spacing during drying to the spacing during packaging, with high precision in the described manner. Additionally, this helps to avoid trouble during packaging without requiring additional power inputs, such as mechanical manipulation means.

Figure 5:
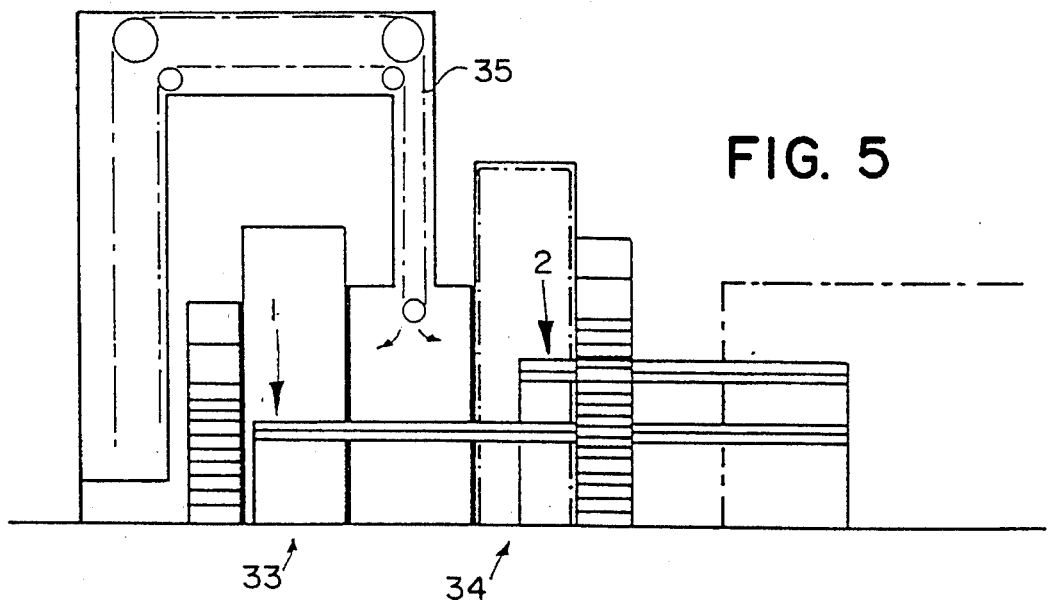
in FIG. 5, a view of the production step in the region of the removal of the dried products from the rods.
Figure 6:
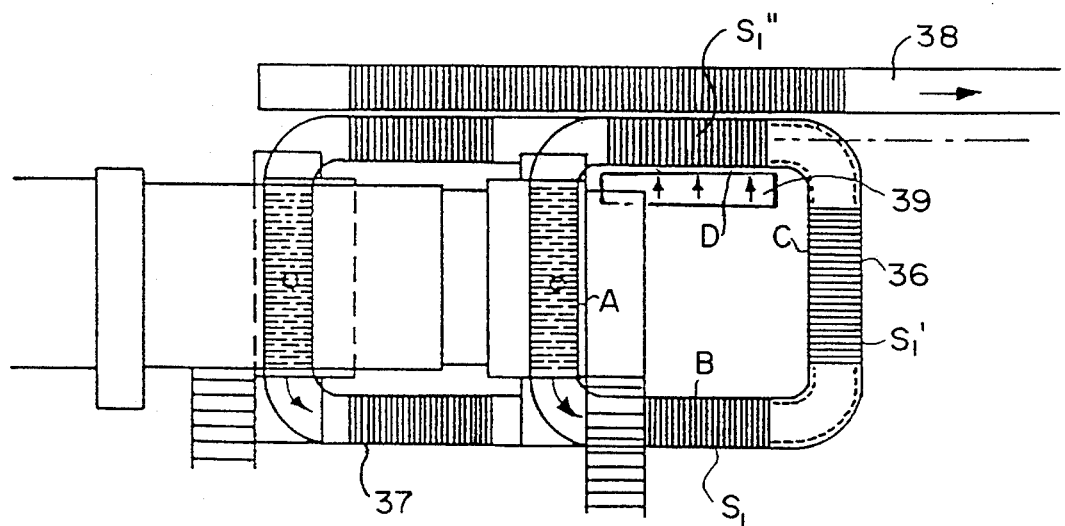
in FIG. 6, a plan view of FIG. 5.

FIGS. 5 and 6 show the steps starting with the removal from the rod until the further conveyance to a packaging unit. The individual, not illustrated, drying rods, with the products or goods hanging thereon, are delivered via a transporting chain 35 and alternately delivered to a rod remover station 33 and 34. The conveyors here take the form of ring-type conveyors 36 and 37, with differing working sequences occurring in each of the four straight conveyor stretches or sections. The received portions are channeled via packaging belt 38, respectively in series, corresponding to the number of prepared portions S (S1, S1', S1"), for automatic packaging and thereafter pushed, by a lateral displacement apparatus 39 onto the packaging band or belt. Via the use of ring-type conveyors, additional methods of operation can be achieved. As many as four stopping periods of the ring-type conveyor and four corresponding working processes are possible. At region A the portions are formed, which at region B, for example, can be augmented to obtain an uneven number of pasta products, via non-illustrated suction grippers for example. At region C, each portion can be individually inspected and, for example, be weighed for an approximate or an exact weight, so that at region C or D, additional pasta products can be added. At region D, packaging of the entire series of portions could take place.

Figure 7:
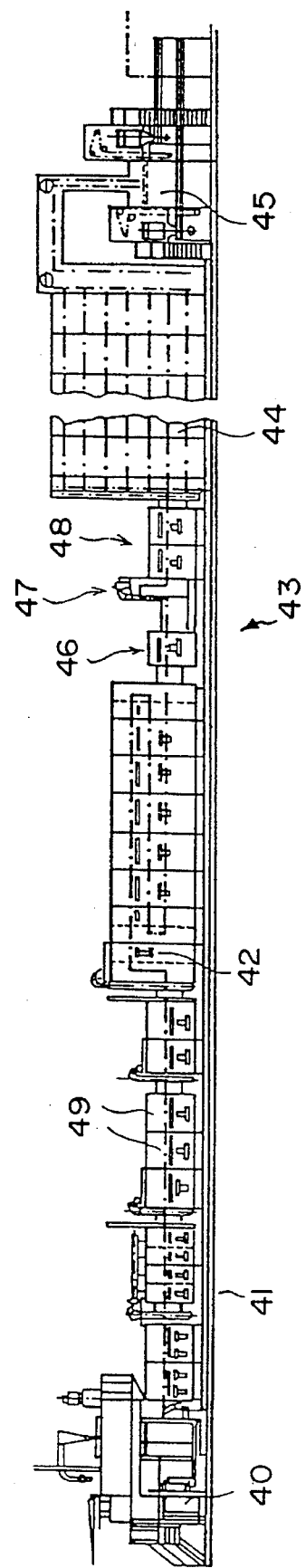
in FIG. 7, schematically an entire pasta products production line.

FIG. 7 represents an entire pasta product production line, having a press 40, a predryer 41, a main dryer 42 as well as a stabilizer 43 and a stacker 44. At the end of the line, a dual unit packaging apparatus 45 is shown. The stabilizer includes a water addition element 46, a sluice 47 as well as a cooling unit 48. Predryer 41 is subdivided into a plurality of single or individual elements 49, each of which has a controllable climate. At the end of the drying cycle, within a climatic zone within a water addition element 46, a small amount of water, for example 0.4% - 1.2%, is applied to the surface of the still hot products, so that the products can be cooled immediately thereafter in a cooling unit 48. Thereafter, the pasta products, in a traditional manner, are stored in stacks as long as is required for the succeeding packaging operation. Even with the very extreme climates that are encountered during drying and the short drying times, drying stresses can be relieved and fractures can be avoided.

Figure 8:
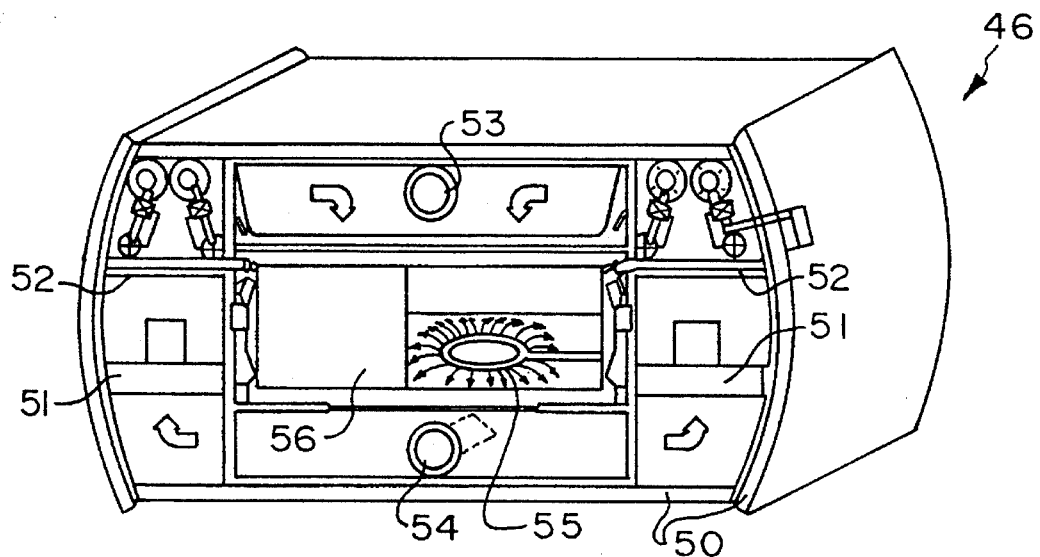
in FIG. 8, a water addition element.

FIG. 8 discloses a water addition element 46. A housing, insulated with plates 50, contains the elements necessary for controlling the climate, such as ventilators 51, heating elements 52, fresh air ducts 53, exhaust air ducts 54 as well as circular conduit 55, which serves for the input of water or steam into treating chamber 56 for adding moisture to the air.

Figure 9:
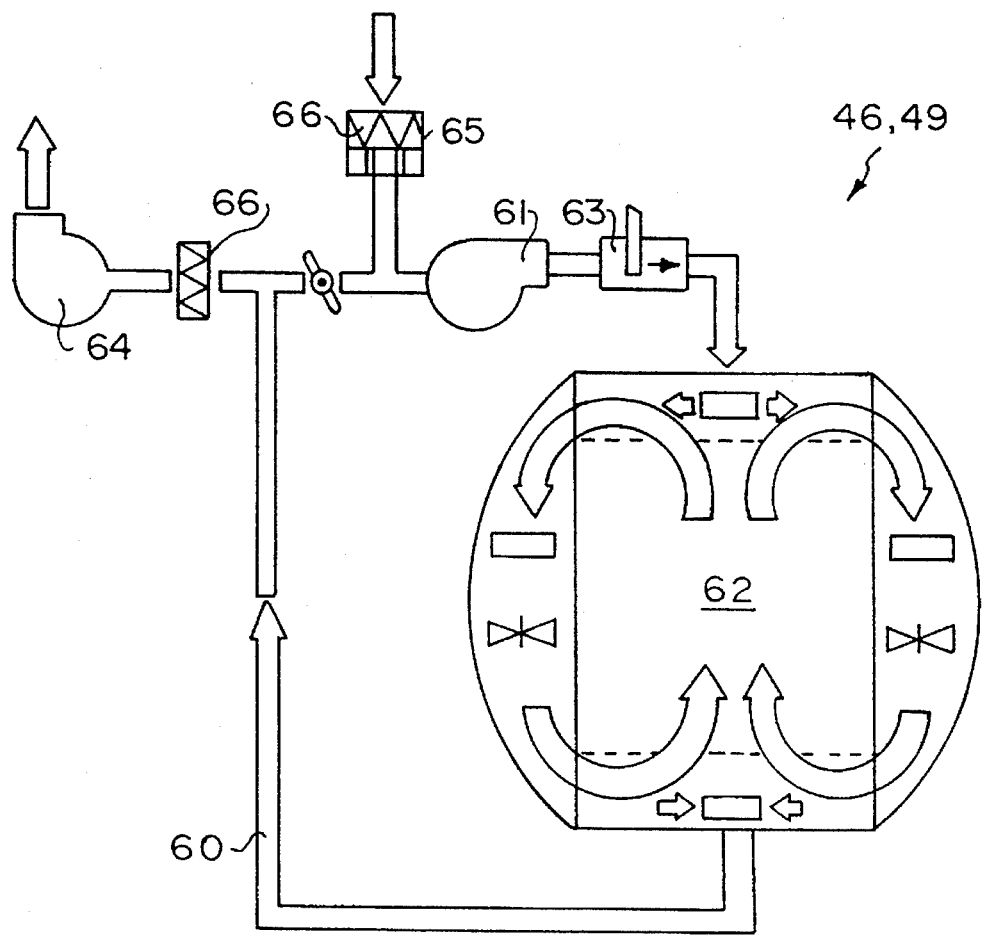
in FIG. 9, the air pipeline according to the turbo system.

FIG. 9 is a schematic showing of a single element 49, that is comprised of water addition element 46 with an additional outer air preparation system 60, the so-called turbo system. Via the use of this system, a specific amount of air is taken from treating chamber 62 by ventilator 61 and treated in a moistening section 63. The corresponding turbo system further includes an exhaust air ventilator 64 as well as a heating element 65 for heating the fresh air, together with control flaps 66.

Figure 10:
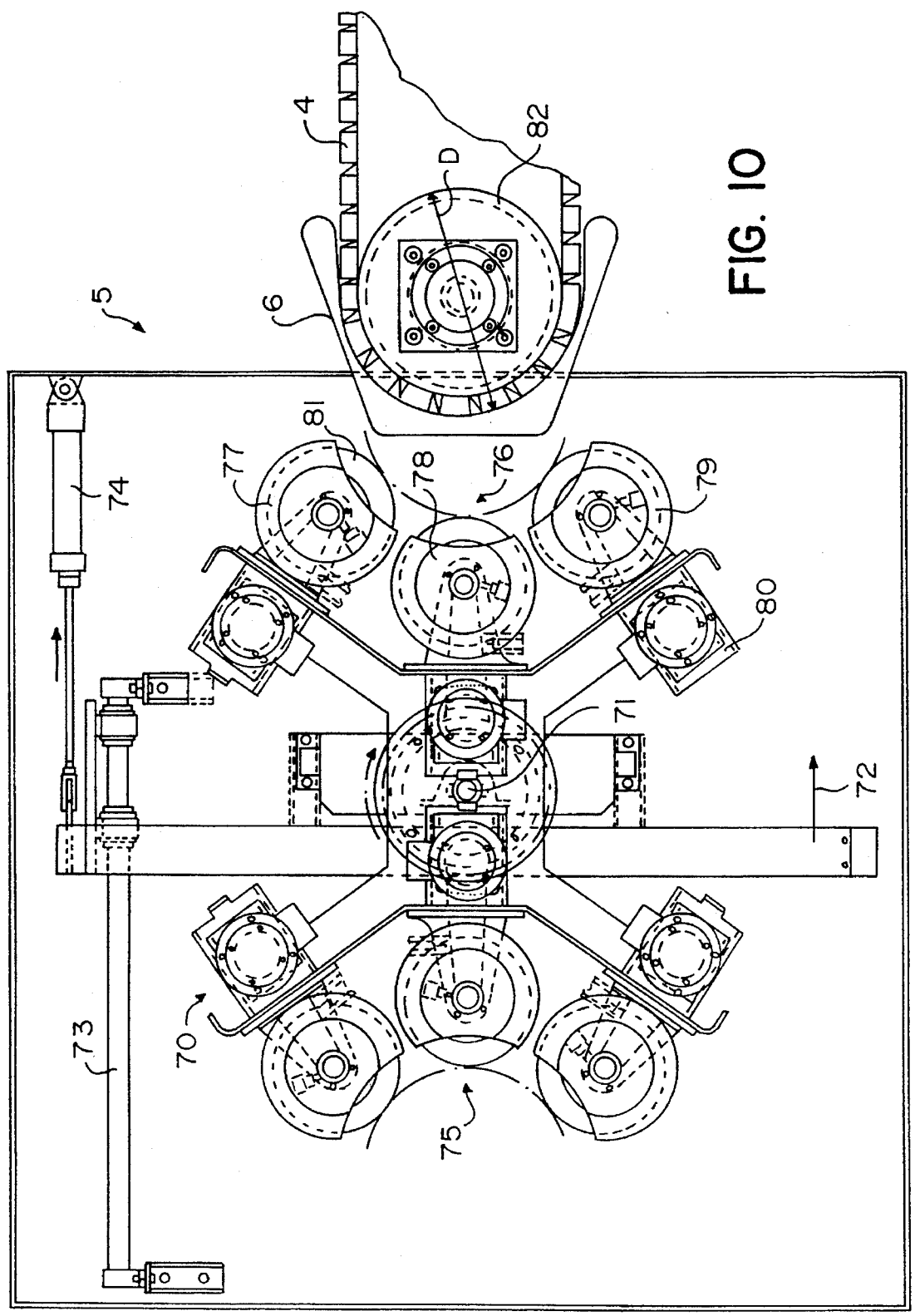
in FIG. 10, a cutter exchange apparatus, as per FIG. 1, in a larger scale.
Figure 12:
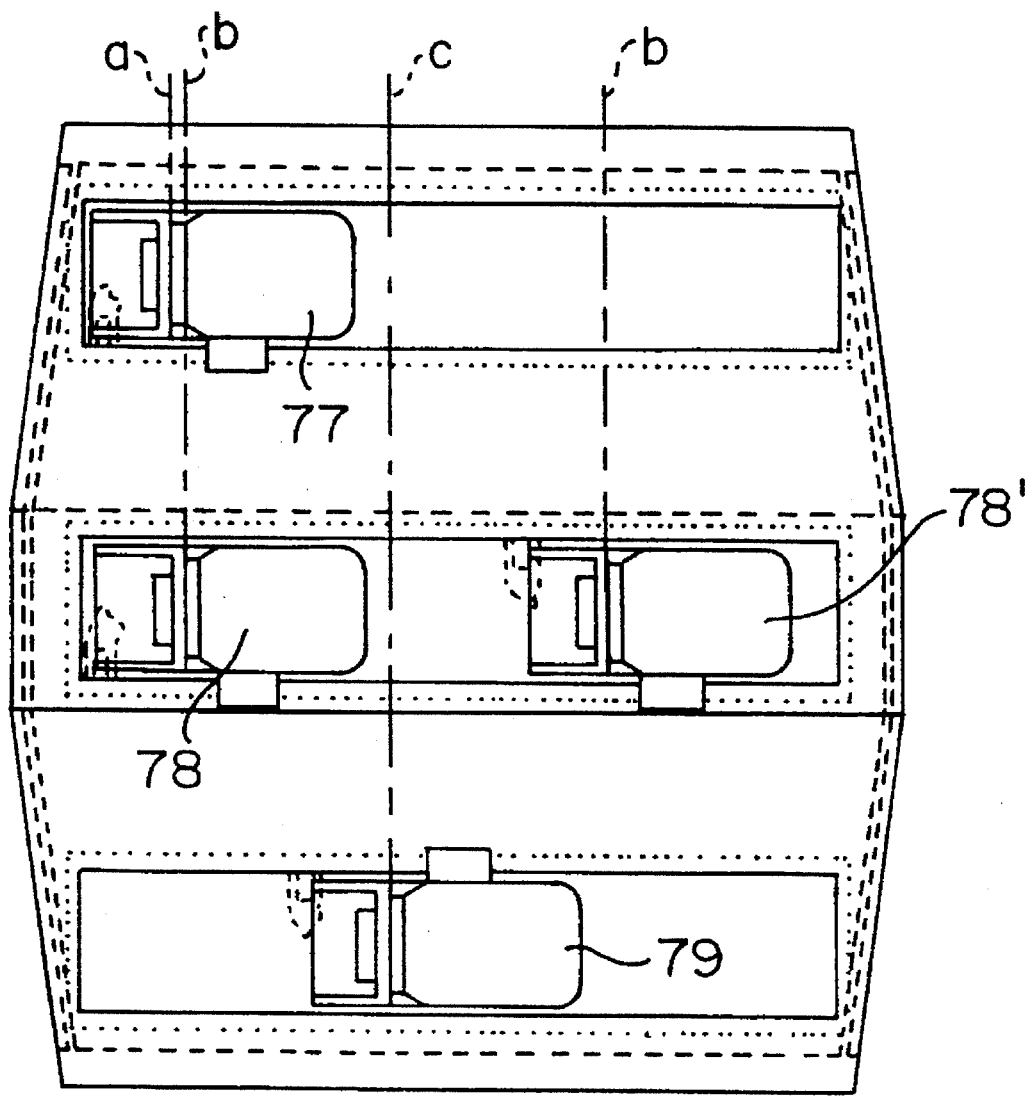
in FIG. 12, the schematic grouping of four cutting heads at an endless conveyor.

Reference is now made to FIG. 10 which shows the entire cutting apparatus 5 at a larger scale. Cutting apparatus 5 takes the form of a reversing or turning head 70, which is tiltable or pivotable 180° around horizontal axis 71. Reversing head 70 is shown in motion, coming from a rest position toward the cutting position (arrow 72). The entire reversing head is movable along horizontal slide guides 73, in the noted positions, by a control cylinder 74. The reversing head is comprised of two substantially identical cutting assemblies, a left cutting assembly 75 as well as a right cutting assembly 76. Each one of cutting head assemblies 75, 76 is provided with several cutting heads 77, 78, each of which is driven by a separate drive unit 80. As can be seen in FIG. 12, center cutting head 78 takes the form of two separate units. This solution provides for optimum operation in that the cutting heads each can simultaneously carry out cutting functions. Cutting head 77 initially cuts off U-shaped bends ab (a) so as to provide two separate superimposed product pieces from the dried product. The product pieces are then cut, by cutting heads 78 to an exact length (b) which, in succession, are then cut, by cutting heads 79, into two equal halves (c). Since the cutting depth of all saw blades 81, in a circular line, approximate the diameter D of reversing wheel 82, and since the saw blades are each offset about 30 degrees, each saw blade works independently, so that the stress upon the products is minimized and in addition provides a very rational cutting process, above all, that the product is handled very carefully. Guide band 6 is comprised of several individual bands, with saw blades 81, respectively being arranged between these individual bands.

Figure 11:
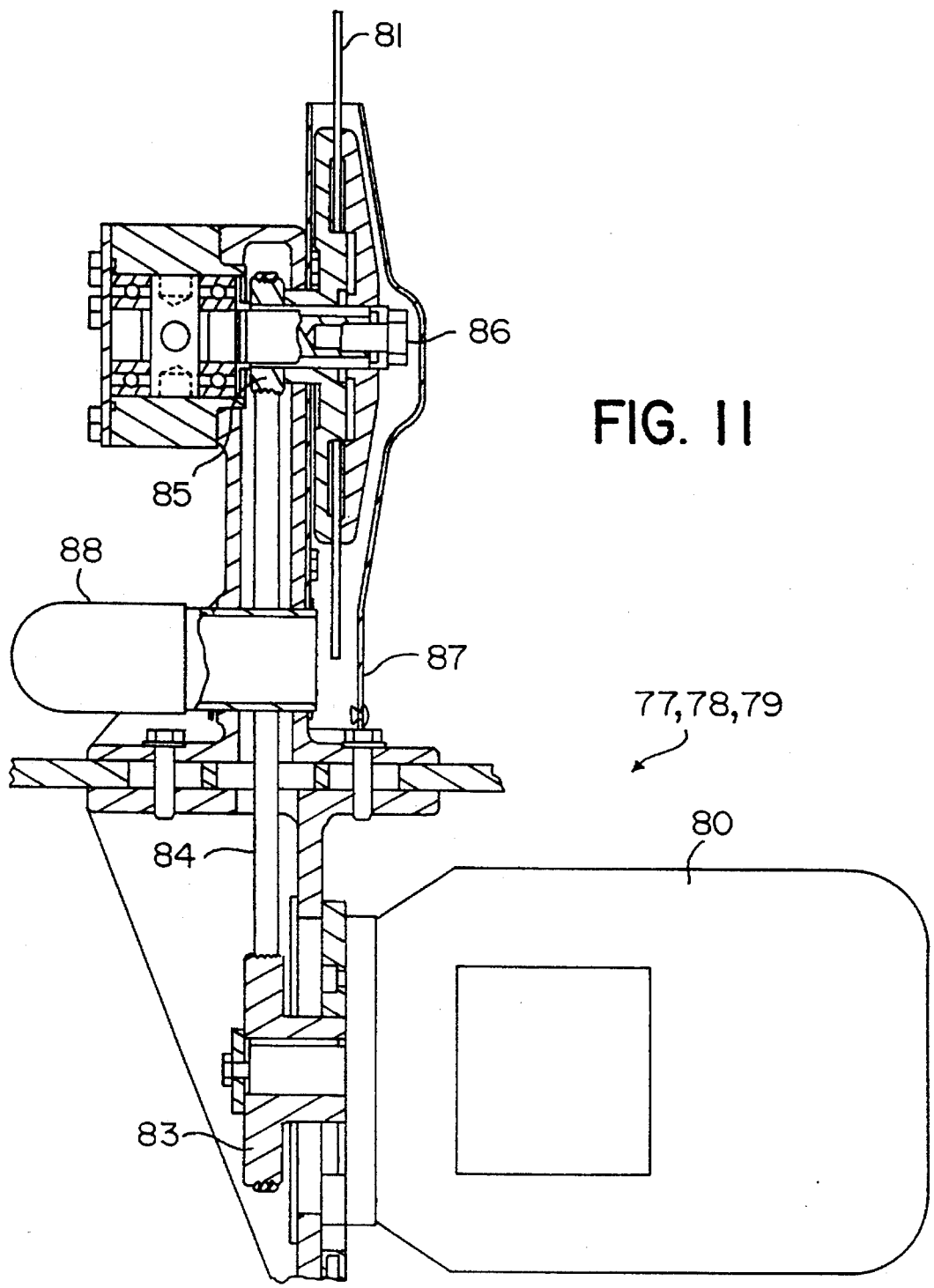
in FIG. 11, a cutting head with a single drive.

FIG. 11 shows cutting heads 77, 78 and 79 in a lager scale. Driving is accomplished via single drives 80 for each head, which is driven via a belt disk 83 and a belt 84, the latter powering belt disk 85 which is fixed on axle 86 of saw blade 81. Saw blade 81 is enclosed by safety cover 87 and the entire construction is built in the manner of circular hand saws to permit the quick exchange of saw blades 81. The region enclosed by the safety cover is connected with an aspirator so that the "saw dust" resulting from all cutting heads can be suctioned off.

what is claimed is:

1. A process for the production of elongated pasta products, comprising the steps of:

forming the pasta products in series via a pasta production apparatus in parallel lines;

drying and stabilizing said pasta products;

cutting said pasta products into packaging length upon solidification of said pasta products;

readying said pasta products for packaging; wherein said forming, drying, stabilizing and cutting steps are performed in said pasta production apparatus with constant lateral spacing and corresponding serial positioning;

wherein said forming step includes, for form stabilization purposes, compression molding the pasta products from a paste having about 28% - 35% water content; said drying step includes heating said pasta products and, in the end phase of the drying process when the products are still warm, increasing the water content of an outer layer of said pasta products, relative to the entire pasta product, at least 0.1% - 1.2% by the addition of water to the outer surface of said pasta products, and, immediately after said water addition, lowering the temperature of said pasta product to under 60° C., and lowering the temperature of a climate surrounding said pasta products, for creating a moistening climate;

wherein during said cutting step, said pasta products are cut and by a cutting apparatus then guided, by an endless conveyor, via a holding device and lower surface of the conveyor, onto a tiltable support surface and are guided, in one of singly and in pairs, via a chute, onto a packaging conveyor; and providing suction apparatuses, corresponding to the number of products per series, above the support surface, said suction apparatus, in stepped time sequence, retaining a single pasta product and singly releasing said single pasta product in a stepped time-delay manner, via the chute, to the packaging conveyor, and turning a second pasta product.

2. An apparatus for the production of elongated pasta products, said apparatus comprising: a pasta press for producing elongated forms for the series production of pasta products in parallel lines; a device for the positioned suspension of said pasta products from drying rods; a flow-through dryer having a stabilizer; a cutting apparatus; a transfer mechanism; and a conveyor for packaging, wherein said flow-through dryer includes a plurality of elements each having a zoned climate control, and including a water addition element, in order to form-stabilize the pasta products, in an end dryer element; said water-addition element including means for maintaining a predetermined temperature climate; and including a cooling element following said water-addition element, said cooling element being separated from said water addition element by a sluice;

wherein said transfer mechanism includes a first conveyor having an associated cutting apparatus, a second conveyor with flaps arranged parallel to and underneath said first conveyor, a linearly movable transfer table, said transfer table being arranged underneath said packaging conveyor, with sensors being arranged at said transfer table for a continuous presence control of said pasta products and including the addition of means for the removal of broken pasta product pieces at said conveyors; and;

wherein said packaging conveyor includes buckets and the addition of sensors in the region between said transfer table and said buckets.

3. An apparatus for the production of elongated pasta products, said apparatus comprising: a pasta press for producing elongated forms for the series production of pasta products in parallel lines; a device for the positioned suspension of said pasta products from drying rods; a flow-through dryer having a stabilizer; a cutting apparatus; a transfer mechanism; and a conveyor for packaging, wherein said flow-through dryer includes a plurality of elements each having a zoned climate control, and including a water addition element, in order to form-stabilize the pasta products, in an end dryer element; said water-addition element including means for maintaining a predetermined temperature climate; and including a cooling element following said water-addition element, said cooling element being separated from said water addition element by a sluice;

wherein said transfer mechanism includes a first conveyor wherein said first conveyor is an endless conveyor; and said cutting apparatus includes a turning mechanism, said turning mechanism being located in a reversing region of said first conveyor;

wherein said cutting apparatus includes several cutting heads arranged in spaced relation to each other; and wherein said cutting mechanism takes the form of a turning mechanism, with means for moving said turning mechanism toward and away from first said conveyor, for turning said cutting mechanism about a horizontal axis.

4. The apparatus of claim 3, wherein said cutting heads are each provided with a single drive, with all functions being controllable via a common control means.

5. The apparatus of claim 4, including the addition of an intermediate storage area in the region of said first conveyor for the serial intermediate storage of individual pasta products.

6. The apparatus of claim 5, wherein said first conveyor takes the form of a ring conveyor.

7. The apparatus of claim 6, wherein said ring conveyor includes a lateral displacement apparatus for the lateral transfer of the entire portions of said pasta products onto a packaging conveyor.

8. The apparatus of claim 7, including the addition of an individual sensor in the region of the transfer chute, at each individual chute, said sensors together with a computer forming a counter, for the production and control of the portion-numbers of said pasta products.

9. The apparatus of claim 8, wherein each sensor takes the form of a photo cell, and via applicable signal processing, can inspect each individual pasta product for damage or breakage.

* * * * *